S. BOWERS.

Broiler.

No. 3,684. Reissued Oct. 19, 1869.

Witnesses:

John L. Lewis.

Charles Hetchum

Inventor:

Sylvester Bowers.

N. PETERS, Photo-Lithographer, Washington, D. C.

United States Patent Office.

THE AMERICAN BROILER COMPANY, OF ELMIRA, NEW YORK, ASSIGNEE OF SYLVESTER BOWERS.

*Letters Patent No.* 80,125, *dated July* 21, 1868; *reissue No.* 3,684, *dated October* 19, 1869.

BROILER.

The Schedule referred to in these Letters Patent and making part of the same.

*To all whom it may concern:*

Be it known that SYLVESTER BOWERS, of Penn Yan, in the county of Yates, and State of New York, did invent a new and useful Improvement in Culinary Utensils for Use on Cooking-Stoves or Ranges; and it is hereby declared that the following is a full, clear, and exact description thereof, reference being had to the annexed drawings, making part of this specification, in which—

The same letters denote like parts in the several figures.

Figure 1:
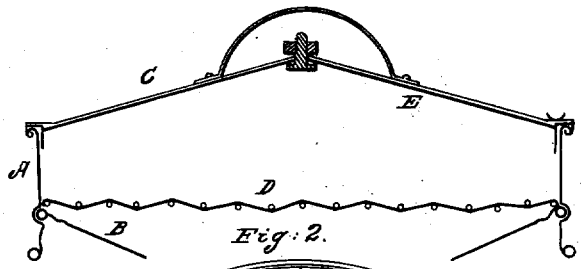
Figure 1 is a central vertical section.
Figure 2:
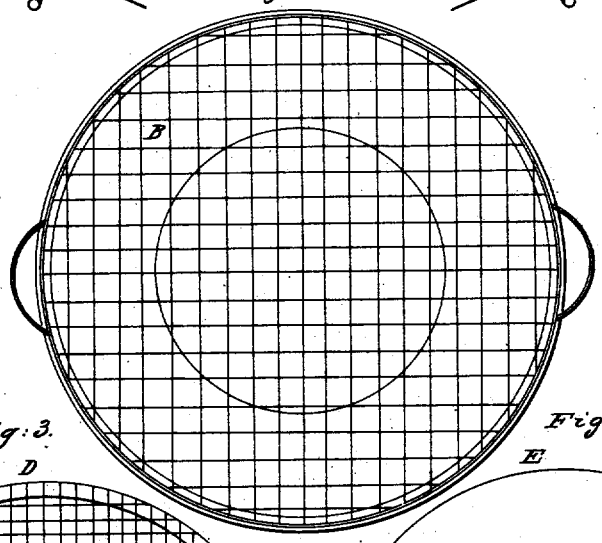
Figure 2 is a plan view with the cover removed.
Figure 3:
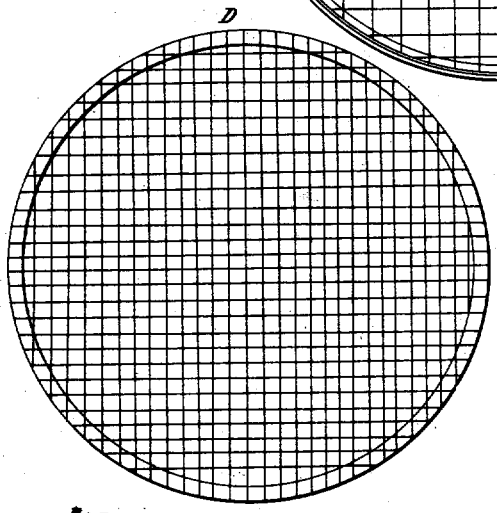
Figure 3 is a plan of the grate detached.
Figure 4:
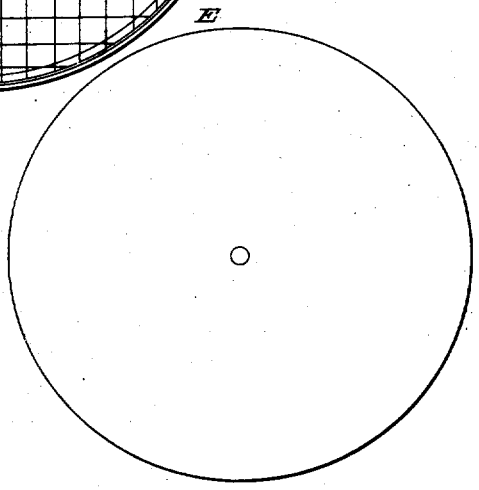
Figure 4 is a plan of the reflector.

The invention relates to an improved culinary utensil for use upon cooking-stoves or ranges; and The improvement consists in so constructing the hoop, with an internal conical flange, as to discharge the grease, in cooking meats, into the fire without coming in contact with the surface of the top plate of the stove or range, and in combining with such hoop and conical flange any one of a series of grates of various degrees of fineness, adapted for the purposes of broiling, toasting, baking, roasting, &c.

To enable those skilled in the art to make and use the invention, its construction and operation will now be described.

In the drawings—

A is a metallic band or hoop, made of either sheet or cast-metal, and of a size and form to adapt it to the hole in the stove or range upon which it is to be used. If made of sheet-metal, it should have an annular recess in its inner face, as shown in fig. 1, to receive the upper edge of the conical flange, to be hereinafter described. If made of cast-metal, the hoop and flange may be cast in one piece.

B is the internal conical flange. It is in the form of a frustum of a cone, or other figure corresponding with the form of the hoop. The upper and outer edge of this flange is attached to the inner face of the hoop, and, extending downward, it converges, so that substances falling upon it shall be carried downward, and discharged through the hole in the top of the stove or range without coming in contact with said top plate.

C is the cover, which may be held on the hoop by a hinge, flange, or any other mode desired. Its use is to cover the utensil, so that when used upon a stove or range it will not interfere with the draught thereof, and also to prevent the smoke coming in contact with the meat or escaping into the kitchen, and also to retain the heat. This cover may, if desired, have fitted upon its inner face a polished sheet of metal, E, serving as a reflector, to throw back the heat upon the upper surface of any article placed upon the grate.

D is the grate. It must be made to fit loosely in the hoop A resting upon the flange B. It may be made of cast-metal or wire, or bars of iron attached to a rim, as preferred, and the meshes may be of any size desired.

Each utensil should be provided with a series of grates of various degrees of fineness, adapted to the various purposes for which the utensil is to be used.

Finer meshes will be required for grates designed for use in roasting coffee, popping corn, &c., than for those used for broiling or baking, and by using different grates for different purposes, the flavor of materials used at one time will not be imparted to another.

What is claimed as the invention of the said SYLVESTER BOWERS, and desired to be secured by Letters Patent, is—

1. A culinary utensil, combining in its construction a converging flange or plate, B, and a grate, D, substantially as described, and for the purposes set forth.

2. The combination of the rim A, internal converging flange B, grate D, and cover C, constructed and arranged in relation to one another, substantially as described, and for the purposes set forth.

3. The combination of the rim A, internal converging flange B, grate D, cover C, and reflector E, constructed and arranged in relation to one another, substantially as described, and for the purposes set forth.

In testimony whereof, this specification has been signed before two subscribing witnesses.

EDWIN A. SCOTT,
*President of the American Broiler Co.*

Witnesses:
LEWIS H. FASSETT,
NEWTON P. FASSETT.